(12) United States Patent
Chen et al.

(10) Patent No.: US 6,194,488 B1
(45) Date of Patent: Feb. 27, 2001

(54) METHOD FOR MAKING POLYMER-COATED PIGMENT PARTICLES USING INITIATOR-TREATED PIGMENTS

(75) Inventors: Jing Hong Chen, Bethlehem, PA (US); Frederic E. Schubert, Shoreham, NY (US)

(73) Assignee: Copytele, Inc., Huntington Station, NY (US)

( * ) Notice: Subject to any disclaimer, the term of this patent is extended or adjusted under 35 U.S.C. 154(b) by 0 days.

(21) Appl. No.: 09/259,769

(22) Filed: Mar. 1, 1999

Related U.S. Application Data

(63) Continuation of application No. 08/916,855, filed on Aug. 22, 1997, now Pat. No. 5,932,633.

(51) Int. Cl.[7] .................................................. C08K 9/04
(52) U.S. Cl. ..................... 523/211; 523/205; 524/190; 522/60; 522/62; 430/32; 430/34; 430/37
(58) Field of Search .................................. 523/205, 211; 522/60, 62; 524/190; 430/32, 34, 37

(56) References Cited

U.S. PATENT DOCUMENTS

| | | |
|---|---|---|
| 3,288,771 * | 11/1966 | MacKenzie et al. . |
| 4,093,534 | 6/1978 | Carter et al. . |
| 4,285,801 | 8/1981 | Chiang . |
| 4,298,448 | 11/1981 | Muller et al. . |
| 4,655,897 | 4/1987 | DiSanto et al. . |
| 4,732,830 | 3/1988 | DiSanto et al. . |
| 5,380,362 | 1/1995 | Schubert . |
| 5,403,518 | 4/1995 | Schubert . |
| 5,411,656 | 5/1995 | Schubert . |
| 5,650,108 * | 7/1997 | Nies et al. . |
| 5,797,873 * | 8/1998 | Franz et al. . |

OTHER PUBLICATIONS

Murau, et al., "The Understanding and Elimination of Some Suspension Instabilities in an Electrophoretic Display", *Jour. of App. Phy.*, vol. 49, No. 9., 1978.

* cited by examiner

*Primary Examiner*—Peter A. Szekely
(74) *Attorney, Agent, or Firm*—Arthur L. Plevy; Buchanan Ingersoll PC

(57) ABSTRACT

A method of making polymer-coated pigment particles, involving the steps of providing a plurality of pigment particles, each of which has an outer surface coated with a layer of material that operates as a nucleus for initiating polymerization on the outer surface of each of the pigment particles. The pigment particles are mixed with a reaction mixture containing a solvent and a monomer material, wherein the layer of material coating each of the pigment particles causes the monomer material to polymerize on the outer surface of substantially each of the pigment particles to form a polymer coating thereon.

12 Claims, 1 Drawing Sheet

METHOD FOR MAKING POLYMER-COATED PIGMENT PARTICLES USING INITIATOR-TREATED PIGMENTS

RELATED PENDING APPLICATIONS

This application is a continuation of Ser. No. 08/916,855 filed Aug. 22, 1997, now U.S. Pat. No. 5,932,633.

Copytele, Inc., the assignee herein, is record owner of U.S. patent application Ser. No. 08/803,716 entitled POLYMERIC-COATED DIELECTRIC PARTICLES AND FORMULATION AND METHODS FOR PREPARING THE SAME filed on Feb. 21, 1997 by Chen et al. now U.S. Pat. No. 5,783,614.

FIELD OF THE INVENTION

The present invention relates generally to pigments and more particularly, to a method of making polymer-coated pigment particles using initiator-treated pigment particles.

BACKGROUND OF THE INVENTION

Pigment particles are used in a variety of applications. For example, dielectric pigment particles suspended in a fluid medium are used in electrophoretic image displays (EPIDs) and electrostatic printers, both of which operate according to the electrophoretic effect. The electrophoretic effect is well known in the art as evidenced by the many patents and articles which describe the effect. As one of ordinary skill in the art will recognize, the electrophoretic effect operates on the principle that pigment particles suspended in the medium can be electrically charged and thereby caused to migrate through the medium to an electrode of opposite charge. For an example of devices using the electrophoretic effect, reference is made to U.S. Pat. No. 4,732,830, issued to Frank J. DiSanto et al., on Mar. 22, 1988, entitled ELECTROPHORETIC DISPLAY PANELS AND ASSOCIATED METHODS, and assigned to Copytele, Inc., the assignee herein.

In typical EPIDs, the dielectric pigment particles are suspended in a fluid medium that is either clear or of an optically-contrasting color as compared with the dielectric pigment particles. To effect the greatest optical contrast between the pigment particles and the fluid suspension medium, it is desirable to have either light-colored pigment particles suspended in a dark medium or dark-colored pigment particles, preferably black, suspended in a backlighted clear medium. A variety of pigment particle and dispersion medium compositions are known in the art. See, for example, U.S. Pat. No. 4,298,444, issued to K. Muller, et al., on Nov. 3, 1981, entitled ELECTROPHORETIC DISPLAY.

It has been found difficult to produce black and other very dark-colored pigment particles that are dielectric, of uniform size, and have a density matching that of a common suspension medium. As a result, EPIDs commonly use readily-manufactured light colored dielectric pigment particles suspended in fluid medium which contain a dark color dye. Such EPIDs are exemplified in U.S. Pat. No. 4,655,897 to DiSanto et al.; U.S. Pat. No. 4,093,534 to Carter et al.; U.S. Pat. No. 4,298,448 to Muller et al.; and U.S. Pat. No. 4,285,801 to Chiang. The use of a yellow pigment particle is disclosed in the following patents, all of which issued to Frederic E. Schubert and are assigned to Copytele, Inc., the assignee herein: U.S. Pat. No. 5,380,362, issued Jan. 10, 1995, entitled SUSPENSION FOR USE IN ELECTROPHORETIC IMAGE DISPLAY SYSTEMS; U.S. Pat. No. 5,403,518, issued Apr. 4, 1995, entitled FORMULATIONS FOR IMPROVED ELECTROPHORETIC DISPLAY SUSPENSIONS AND RELATED METHODS; and U.S. Pat. No. 5,411,656, issued May 2, 1995, entitled GAS ABSORPTION ADDITIVES FOR ELECTROPHORETIC SUSPENSIONS.

The selection of the dielectric pigment particles used in the EPID (electrophoretic particles) is very important in determining performance of the EPID and the quality of the image produced. Ideally, the electrophoretic particles should have an optimum charge-to-mass ratio, which is dependent upon the particle size and surface charge; the optimum charge-to-mass ratio is desirable to obtain good electrostatic deposition at high velocity as well as rapid reversal of particle motion when voltages change.

There are advantages to polymerically coating the pigment particles used in EPIDs or other electrophoretic-effect devices. A polymer coating applied to the pigment particles can have the effect of enhancing the ability of the pigment particles to scatter light. When polymer-coated pigment particles impinge upon a transparent screen electrode (thereby displacing the fluid medium from the screen), a brighter color and sharper image is produced (as compared with when uncoated pigment particles are used). Additionally, it naturally is desirable to use pigment particles that are stable and resistant to interaction with the fluid suspension medium to improve the efficiency and lifetime of the EPID; the fluid suspension medium may comprise, for example, aromatic or aliphatic solvents, including benzenes, toluenes, hydrocarbon oil, nonane, decane, or the like, which may react with some typical pigment particles used in EPIDs. Polymer-coated pigment particles can produce a harder and more solvent-resistant composite when compared to uncoated pigment particles.

Furthermore, polymer-coated pigment particles can be less apt to adhere to surfaces within the electrophoretic cell. Over recent years, attention has been directed to dispersion stabilization by way of adsorbed polymers on particle surfaces. See, for example, an article by P. Murau and B Singer, appearing in Vol 49, No. 9, of the Journal of Applied Physics (1978), entitled "The Understanding and Elimination of Some Suspension Instabilities in an Electrophoretic Display." See also U.S. Pat No. 5,403,518, issued to Schubert, referenced above, and U.S. Pat. No. 4,285,801, issued to Anne A. Chiang on Aug. 25, 1981, entitled ELECTROPHORETIC DISPLAY COMPOSITION.

It has been discovered that fluoro polymers are advantageous for use as pigment particle coatings, as they have low critical surface tensions which tend to produce anti-stick properties. See, for example, an article by M. Hudlicry and A. E. Pavlath, appearing in Vol. 187, page 983, of ACS Monograph (1995), entitled "Properties of Fluorinated Compounds II." The lower surface tensions of perfluorinated polymers, when used as a pigment particle coatings, leads to less interaction between the pigment particle surfaces and the solvents comprising the fluid suspension medium in which the pigment particles are dispersed. The stabilizing polymer molecule hydrocarbon chains are more apt to extend out into the solvent and not sit on the particle surface because of its anti-static character. This enhances the efficiency of the stabilizing mechanism.

There are many different methods for preparing polymer-coated particles. For example, thirty different methods are reported in an article by R. E. Sparks, et al., edited by M. A. El-Nokaly et. al., *Polymeric Delivery Systems* ACS Symposium Series #520, Washington D.C. (1993). All of these methods produce a three component mixture comprising polymer-coated particles, uncoated particles and pure polymer particles (polymer particles having no pigment particle core for example).

Accordingly, a need exists for an improved method of manufacturing polymer-coated pigment particles which yields substantially no uncoated pigment particles and substantially no polymer particles having no pigment particle core.

SUMMARY OF THE INVENTION

A method of making polymer-coated pigment particles, comprising the steps of providing a plurality of pigment particles, each of which have an outer surface coated with a layer of material that operates as a nucleus for initiating polymerization on the outer surface of each of the pigment particles. The pigment particles are mixed with a reaction mixture containing a solvent and a monomer material, wherein the layer of material coating each of the pigment particles causes the monomer material to polymerize on the outer surface of substantially each of the pigment particles to form a polymer coating thereon.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

As will become apparent, the method described herein for manufacturing polymer-coated particles is especially useful for making polymer-coated pigment particles that are used in electrophoretic image displays (EPIDs) and like electrophoretic-effect devices. It should be understood, however, that the method of the present invention is also useful for making other types of polymer-coated pigment and like particles that are used in many different applications such as paint, ink, and electrostatic toner.

The key component of the method of the present invention is in the use of initiator-treated pigment particles to produce polymer-coated pigment particles. Initiator-treated pigment particles are described in copending U.S. Patent Application Serial No. entitled INITIATOR-TREATED PIGMENT PARTICLES AND METHOD FOR PREPARING SAME Jing Hong Chemby filed on Aug. 22, 1997, now U.S. Pat. No. 5,964,935, and assigned to Copy-tele, Inc., the assignee herein.

Figure 1:
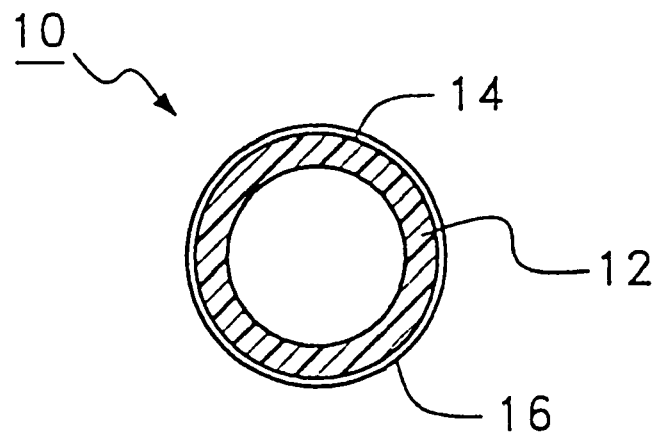
FIG. 1 is a cross-sectional view through an initiator-treated particle used in the method of the present invention and FIG. 2 is a cross-sectional view through a polymer-coated particle prepared in accordance with the method of the present invention.

Referring to FIG. 1, a cross-sectional view through an initiator-treated pigment particle 10 is depicted. Each initiator-treated pigment particle 10 comprises a core pigment particle 12 whose outer surface 14 is coated by a layer 16 of material which initiates polymerization on the outer surface 14 of the core pigment particle 12. In other words, the layer 16 of initiator material serves as a nucleus for polymerization to initiate on the outer surface 14 of the core pigment particle 12. The layer 16 of initiator material is selected from azo-initiators, photo-initiators, organic peroxides and the like.

An exemplary embodiment of the method of the present invention is as follows. First, an appropriate type of initiator-treated pigment particles is selected. This is based upon the desired type of core pigment particles to be polymer-coated. For example, if the desired core pigment particles to be polymer-coated are Diarylide yellow pigment particles, then a Diarylide yellow pigment particles which have been initiator-treated are selected. If none are readily available, the appropriate initiator-treated particles can be produced as follows.

The selected core pigment particles to be polymer-coated are cleaned and dried using conventional techniques. The pigment particles are then dispersed in a solvent containing a pigment wetting agent and dissolved initiator material. The wetting agent aids in dispersing the pigment particles in the solvent so that all the pigment particles are coated with the initiator material. This produces a mixture of pigment particles, solvent, and initiator material.

Next, the mixture is sonicated for approximately 20 minutes using a Sonicor Model 1150 Ultrasonic Probe or like device. After sonication, the mixture is placed in an evaporator and the solvent is evaporated at room temperature which leaves the desired initiator-treated pigment particles.

Table I below provides an exemplary formulation for making initiator-treated particles which are used in the method of the present invention:

TABLE I

| Materials | Weight(grams) |
| --- | --- |
| Pigment | 1.2–1.4 |
| Initiator | 0.02–0.10 |
| Wetting Agent for pigment | 3.0–5.0 |
| Solvent | 30.0–35.0 |

Light and dark colored, inorganic pigments, organic pigments, and various particles produced from polymers, dyes and the like can be initiator-treated and thus, used in the method of the present invention. Examples of light and dark colored inorganic and organic pigments include titanium dioxide, zinc oxide, zinc sulfide, silica, calcium silicate, alumina hydrate, carbon black, iron oxide black, lamp black, Zn Fe Cr brown Spinel, Magnesium Ferrite, Chreen Spinel, Cr oxide Green, Diarylide Yellow, Arylide Yellow, Hansa Yellow, Benzidine Yellow, Perinone Orange, Diarylide Orange, Ultramarine Blue, Indanthrone Blue, Ultramarine Blue Dixoazine Violet, Quinacridone Violet, Anthraquinoid Red, and Perylene Red and the like.

The polymerization initiator material described in Table I is selected from azo-initiators, photo-initiators, organic peroxides and the like. A preferred polymerization initiator material is 4,4'-Azobis (4-cyanovaleric acid). Other polymerization initiator materials include 2,2"-azobis (2-methyl-butyrontrile), benzoyl peroxide, lauroyl peroxide, octanoyl peroxide, and the like.

The solvent described in Table I is selected from various aromatic hydrocarbons, aliphatic hydrocarbons, dioxane and dichloromethane. The aromatic hydrocarbon solvents preferably include benzene, toluene, xylene, or tertiary butyl benzene. The aliphatic hydrocarbon solvents preferably include hexane or decane.

The wetting agent described in Table I is selected from alkyl hydrocarbons with functional groups. The preferred wetting agents are alkyl hydrocarbons with functional groups —OH and —$NH_2$.

Getting back to the method of the present invention, once the initiator-treated pigment particles have been selected or prepared as described above, they are mixed with a solvent that contains the desired monomer for polymer coating according to the exemplary recipe described below in Table II.

TABLE II

| Materials | Weight(grams) |
| --- | --- |
| Initiator Treated Particles | 1.45–2.0 |
| Monomer | 1.0–6.0 |
| Solvent | 25.0–35.0 |

Polymerization is initiated on the surface of each initiator-treated pigment particle via the initiator coating, by placing the reaction mixture in a conventional shaker device which contains zirconium oxide beads. The reaction mixture is shaken for approximately two hours. After shaking, the zirconium oxide beads are removed by screening and the reaction mixture is placed in a conventional temperature-controlled tumbler reactor and tumbled at a rotation rate of approximately 40 rpm for approximately six hours at 60° C. and then tumbled about 30 more hours at 70° C. to produce the desired polymer-coated pigment particles.

The polymer-coated pigment particles are then washed with hexane and alcohol to remove any soluble impurities, using a soxhlet extractor or like apparatus. After washing, the polymer-coated pigment particles are dried in a vacuum oven. The success of the method of the present invention has been ascertained by scanning electron microscopy, particle size analysis and particle density measurements.

Figure 2:
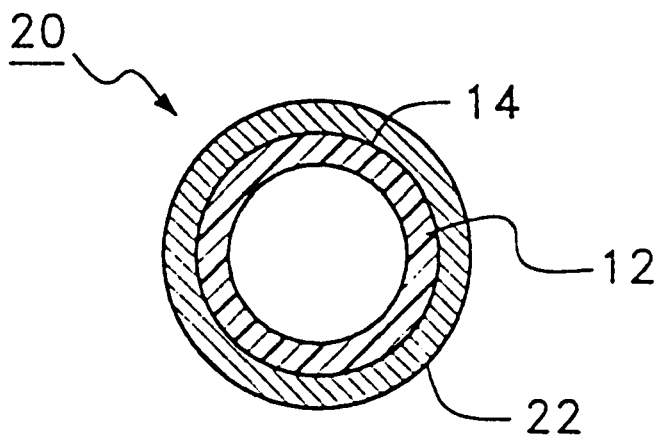

FIG. 2 depicts a cross-sectional view through a polymer-treated pigment particle 20 produced by the method of the present invention. As shown, the polymer-coated pigment particle 20 comprises the core pigment particle 12 shown in FIG. 1. However, the layer of initiator material 16 shown in FIG. 1 has been replaced by a polymer coating 22 in FIG. 2 via the polymerization reaction which was initiated on the surface 14 of the core pigment particle 12 by the layer of initiator material 16.

Tables III, IV, and V respectively describe exemplary recipes for making pentafluoropolystyrene coated pigment particles, polystyrene/divinyl benzene coated pigment particles, and porous polymer treated pigment particles, using the method of the present invention. By varying the recipes given below, or by varying other reaction parameters, the physical characteristics of the polymer-coated pigment particles can be selectively altered as desired for a given application.

TABLE III

| Materials | Weight(grams) |
| --- | --- |
| Initiator Treated Particles | 1.20–1.50 |
| Pentaflurostyrene | 0.5–2.0 |
| Hydrocarbon Solvent | 20.0–30.0 |

TABLE IV

| Materials | Weight(grams) |
| --- | --- |
| Initiator Treated Particles | 1.20–1.50 |
| Styrene | 0.10–2.0 |

TABLE IV-continued

| Materials | Weight(grams) |
| --- | --- |
| Divinylbenzene | 0.50–6.0 |
| Hydrocarbon Solvent | 25.0–35.0 |

TABLE V

| Materials | Weight(grams) |
| --- | --- |
| Initiator Treated Particles | 1.20–1.50 |
| Styrene | 0.0–2.0 |
| Divinylbenzene | 0.5–6.0 |
| Diluent | 0.3–4.0 |
| Hydrocarbon Solvent | 25.0–35.0 |

In the recipe of Table III, 2,3,4,5,6-Pentaflurostyrene is selected as the monomer for preparing the Pentaflurostyrene coated pigment particles. When this monomer is polymerized, it produces a near-perfluorinated polymer coating that functions as an effective coating for the pigment particles, since perfluorinated polymers have low critical surface tensions.

The Styrene selected as the monomers in the recipes of Tables IV and V is commercially available from Fisher Scientific, Inc. The diviny/benzene selected as the crosslinker n the recipes of Tables IV and V is commercially produced by Dow Chemicals, Inc.

The Hydrocarbon solvents used in the recipes of Tables III, IV, and V are preferably selected from decane or nonane. Other like hydrocarbon solvents can be used also.

For non-aqueous systems, dispersion agents would be used in the above recipes, selected from alkyl hydrocarbons with functional groups —OH and —NH$_2$. For aqueous systems, surfactants would be used in the above recipes, selected from sodium lauryl sulfate, sodium dodecyl sulfate, Dowfax surfactants, Igepal surfactants, Aerosol surfactants, Pluronic surfactants, Cantrez surfactants, Arlacel surfactants, Tetronic surfactants, poly(vinylalcohol), poly (ethylene oxide), and the like.

The Diluent used in the recipe of Table V is n-hexanol or the like.

The method of the present invention has the advantages of yielding only polymer-coated pigment particles and substantially no uncoated pigment particles and substantially no polymer particles having no pigment particle core. Accordingly, the method of the present invention requires no special separation and purification techniques because only the polymer-coated pigment particles are formed.

Further, the method of the present invention requires no special polymerization techniques, as it has been used successfully in emulsion, dispersion, suspension and inverse emulsion polymerization formats, to produce polymer-coated pigment particles. Moreover, the method of the present invention can be used to form polymer coatings on pigment particles from addition and condensation polymerizations.

Still further, the method of the present invention can be used to polymer-coat many different types of pigment particles. Inorganic polymer pigment particles, metal-organic polymer pigment particles and ceramic pigment particles are examples of some of the different types of pigment particles that can be coated using the method of the present invention.

It will be understood that the embodiments described herein are merely exemplary and that a person skilled in the art may make many variations and modifications to the described embodiments utilizing functionally equivalent elements to those described. Any variations or modifications to the invention described hereinabove are intended to be included within the scope of the invention as defined by the appended claims.

What is claimed is:

1. A formulation which provides polymer-coated pigment particles that are used in an electrophoretic-effect device, comprising:

a solvent;

a monomer; wherein said monomer is dissolved in said solvent; and a plurality of pigment particles, wherein said particles are dispersed in said solvent, wherein each of said particles has an outer surface coated with a layer of material which causes said monomer to polymerize on said outer surface of substantially each of said pigment particles thereby forming a polymer coating thereon.

2. The formulation of claim 1, wherein said solvent is a hydrocarbon solvent.

3. The formulation of claim 2, wherein hydrocarbon solvent is selected from the group consisting of decane and nonane.

4. The formulation of claim 1, wherein said layer of material is selected from the group consisting of azo-initiators, photo-initiators, and organic peroxides.

5. The formulation of claim 1, wherein said plurality of pigment particles are selected from the group consisting of inorganic pigment particles, organic pigment particles, polymer pigment particles, and dye pigment particles.

6. The formulation of claim 1, further comprising a cross-linker dissolved in said solvent.

7. The formulation of claim 1, wherein said monomer is selected from the group consisting of pentafluorostyrene and styrene.

8. A formulation for polymer-coated pigment particles that are used in an electrophoretic-effect device, comprising:

a solvent;

a cross linker dissolved in said solvent;

a monomer dissolved in said solvent; and a plurality of pigment particles dispersed in said solvent, each of said particles having an outer surface coated with a layer of material which causes said monomer material to polymerize on said outer surface of substantially each of said pigment particles to form a polymer coating thereon.

9. The formulation of claim 8, wherein said cross-linker comprises diviny/benzene.

10. The formulation of claim 8, further comprising a diluent dissolved in said solvent.

11. The formulation of claim 10, wherein said diluent comprises ethyl alcohol.

12. A formulation for polymer-coated pigment particles that are used in an electrophoretic-effect device, comprising:

a solvent selected from the group consisting of nonane and decane;

a monomer dissolved in said solvent; and a plurality of pigment particles dispersed in said solvent, each of said particles having an outer surface coated with a layer of material which causes said monomer material to polymerize on said outer surface of substantially each of said pigment particles to form a polymer coating thereon.

* * * * *